United States Patent
Shah et al.

(10) Patent No.: US 8,472,943 B1
(45) Date of Patent: Jun. 25, 2013

(54) METHOD AND SYSTEM FOR USING MULTIPLE CHANNEL ELEMENTS

(75) Inventors: Maulik K. Shah, Overland Park, KS (US); Jasinder P. Singh, Olathe, KS (US); Jason P. Sigg, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 295 days.

(21) Appl. No.: 12/793,484

(22) Filed: Jun. 3, 2010

(51) Int. Cl.
*H04W 24/00* (2009.01)

(52) U.S. Cl.
USPC ............ 455/423; 455/438; 455/78; 455/63.1; 455/67.11; 370/332

(58) Field of Classification Search
USPC ............... 455/438, 423, 456.5, 67.11, 63.1, 455/67.13, 78; 370/216, 332, 333, 334
See application file for complete search history.

(56) References Cited

U.S. PATENT DOCUMENTS

| | | | |
|---|---|---|---|
| 5,991,282 A * | 11/1999 | Langlet et al. ................ | 370/332 |
| 6,035,210 A * | 3/2000 | Endo et al. .................... | 455/522 |
| 6,073,025 A * | 6/2000 | Chheda et al. ................ | 455/522 |
| 6,201,795 B1 * | 3/2001 | Baum et al. .................... | 370/252 |
| 6,321,089 B1 * | 11/2001 | Han ............................. | 455/438 |
| 6,496,475 B1 | 12/2002 | Ji et al. | |
| 6,687,502 B2 | 2/2004 | Oh et al. | |
| 6,993,341 B2 * | 1/2006 | Hunzinger .................... | 455/450 |
| 7,269,423 B2 | 9/2007 | Lee et al. | |
| 7,286,505 B2 | 10/2007 | Trabelsi et al. | |
| 7,391,755 B2 * | 6/2008 | Gopalakrishnan et al. ... | 370/334 |
| 7,509,128 B2 | 3/2009 | Choi et al. | |
| 7,647,054 B2 | 1/2010 | Choi et al. | |
| 7,684,808 B1 | 3/2010 | Woleben et al. | |
| 7,688,899 B2 * | 3/2010 | Ketchum et al. .............. | 375/260 |
| 7,983,708 B2 * | 7/2011 | Mehrabanzad et al. ...... | 455/522 |
| 2002/0141520 A1 * | 10/2002 | Nigrin et al. .................. | 375/347 |
| 2004/0062221 A1 * | 4/2004 | Gopalakrishnan et al. ... | 370/335 |
| 2004/0203422 A1 * | 10/2004 | Srey et al. .................. | 455/67.11 |
| 2005/0063340 A1 * | 3/2005 | Hoffmann et al. ............ | 370/332 |
| 2005/0073975 A1 * | 4/2005 | Chen et al. .................... | 370/331 |
| 2005/0075081 A1 * | 4/2005 | Catreux-Erceg et al. ....... | 455/78 |
| 2005/0120282 A1 * | 6/2005 | Kim ............................. | 714/707 |
| 2005/0201332 A1 * | 9/2005 | Bakshi et al. ................. | 370/333 |
| 2005/0265249 A1 * | 12/2005 | Nagaraj ....................... | 370/252 |
| 2006/0018288 A1 * | 1/2006 | Luo et al. ..................... | 370/334 |
| 2006/0030278 A1 * | 2/2006 | Konaka .......................... | 455/78 |

(Continued)

OTHER PUBLICATIONS

U.S. Appl. No. 11/935,226, filed Nov. 5, 2007.

*Primary Examiner* — Kamran Afshar
*Assistant Examiner* — Mong-Thuy Tran

(57) ABSTRACT

A radio access network (RAN) includes a plurality of reverse-link channel elements for receiving signals and a plurality of forward-link channel elements for transmitting signals. The RAN may detect a fault condition in a signal transmitted by a mobile station and received through a reverse-link channel element or in a signal transmitted through a forward-link channel element and received by a mobile station, for example, based on a frame error rate in the received signal exceeding a threshold. The RAN may determine whether a radio frequency (RF) condition accounts for the fault condition. If the RF condition does not account for the fault condition, the RAN may allocate a second channel element such that the signal is received or transmitted through two different channel elements. If the second channel element improves the quality of the received signal, the BTS may discontinue use of the first channel element.

19 Claims, 4 Drawing Sheets

U.S. PATENT DOCUMENTS

| | | | |
|---|---|---|---|
| 2006/0188031 A1* | 8/2006 | Liu | 375/260 |
| 2006/0217851 A1* | 9/2006 | McGuffin et al. | 701/4 |
| 2006/0245525 A1* | 11/2006 | Cho | 375/340 |
| 2007/0153744 A1* | 7/2007 | Goldberg | 370/334 |
| 2008/0123583 A1* | 5/2008 | Shiizaki et al. | 370/315 |
| 2008/0232325 A1* | 9/2008 | Mehta et al. | 370/332 |
| 2008/0280581 A1* | 11/2008 | Rofougaran et al. | 455/296 |
| 2009/0022110 A1* | 1/2009 | Muharemovic et al. | 370/336 |
| 2009/0191831 A1* | 7/2009 | Sasaki et al. | 455/272 |

* cited by examiner

METHOD AND SYSTEM FOR USING MULTIPLE CHANNEL ELEMENTS

BACKGROUND

A base transceiver station (BTS) in a radio access network (RAN) may support a plurality of forward link channels for transmitting forward link signals to mobile stations and a plurality of reverse link channels for receiving reverse link signals from mobile stations. The forward link channels could include, for example, a pilot channel for transmitting a pilot signal, a sync channel for transmitting system information, a paging or control channel for transmitting page messages and overhead messages, and one or more forward traffic channels for transmitting signals to mobile stations engaged in active calls. The reverse link channels could include, for example, one or more reverse traffic channels for receiving signals from mobile stations engaged in active calls and one or more access channels that mobile stations may use to contact the RAN.

A BTS may include a plurality of forward-link channel elements for transmitting signals over forward link channels and a plurality of reverse-link channel elements for receiving signals over reverse link channels. Each forward-link channel element may be associated with a respective forward link channel, and each reverse-link channel element may be associated with a respective reverse link channel. When a mobile station becomes engaged in a call, the BTS may assign a forward traffic channel and a reverse traffic channel for the call. The BTS may then transmit signals to the mobile station through a forward-link channel element associated with the forward traffic channel and receive signals from the mobile station through a reverse-link channel element associated with the reverse traffic channel.

OVERVIEW

In a first principal aspect, an exemplary embodiment provides a method for a radio access network (RAN). The RAN uses a first channel element to receive a signal that is wirelessly transmitted by a mobile station over a reverse link channel. The RAN detects a fault condition in the signal received through the first channel element. The RAN determines that a radio frequency (RF) condition does not account for the fault condition. In response to determining that the RF condition does not account for the fault condition, the RAN allocates a second channel element to receive the signal. The RAN uses both of the first and second channel elements to receive the signal.

In a second principal aspect, an exemplary embodiment provides a method for a radio access network (RAN). The RAN uses a first channel element to wirelessly transmit a signal to a mobile station over a forward link channel. The RAN detects a fault condition in the signal received by the mobile station. The RAN determines that a radio (RF) condition does not account for the fault condition. In response to determining that the RF condition does not account for the fault condition, the RAN allocates a second channel element to wirelessly transmit the signal. The RAN uses both the first and second channel elements to wirelessly transmit the signal to the mobile station.

In a third principal aspect, an exemplary embodiment provides a system comprising a plurality of channel elements for receiving signals over reverse link channels and a controller. The controller is configured to (i) detect a fault condition in a signal that is wireless transmitted by a mobile station and received by a first channel element in the plurality of channel elements, (ii) determine whether a radio frequency condition accounts for the fault condition, and (iii) in response to determining that the radio frequency condition does not account for the fault condition, allocate a second channel element in the plurality of channel elements such that both of the first and second channel elements are used to receive the signal.

In a fourth principal aspect, an exemplary embodiment provides a system comprising a plurality of channel elements for transmitting signals over forward link channels and a controller. The controller is configured to (i) detect a fault condition in a signal that is wirelessly transmitted by a first channel element in the plurality of channel elements and received by a mobile station, (ii) determine whether a radio frequency condition accounts for the fault condition, and (iii) in response to determining that the radio frequency condition does not account for the fault condition, allocate second channel element in the plurality of channel elements such that both of the first and second channel elements are used to wirelessly transmit the signal to the mobile station.

DETAILED DESCRIPTION OF EXEMPLARY EMBODIMENTS

1. Introduction

Figure 1:
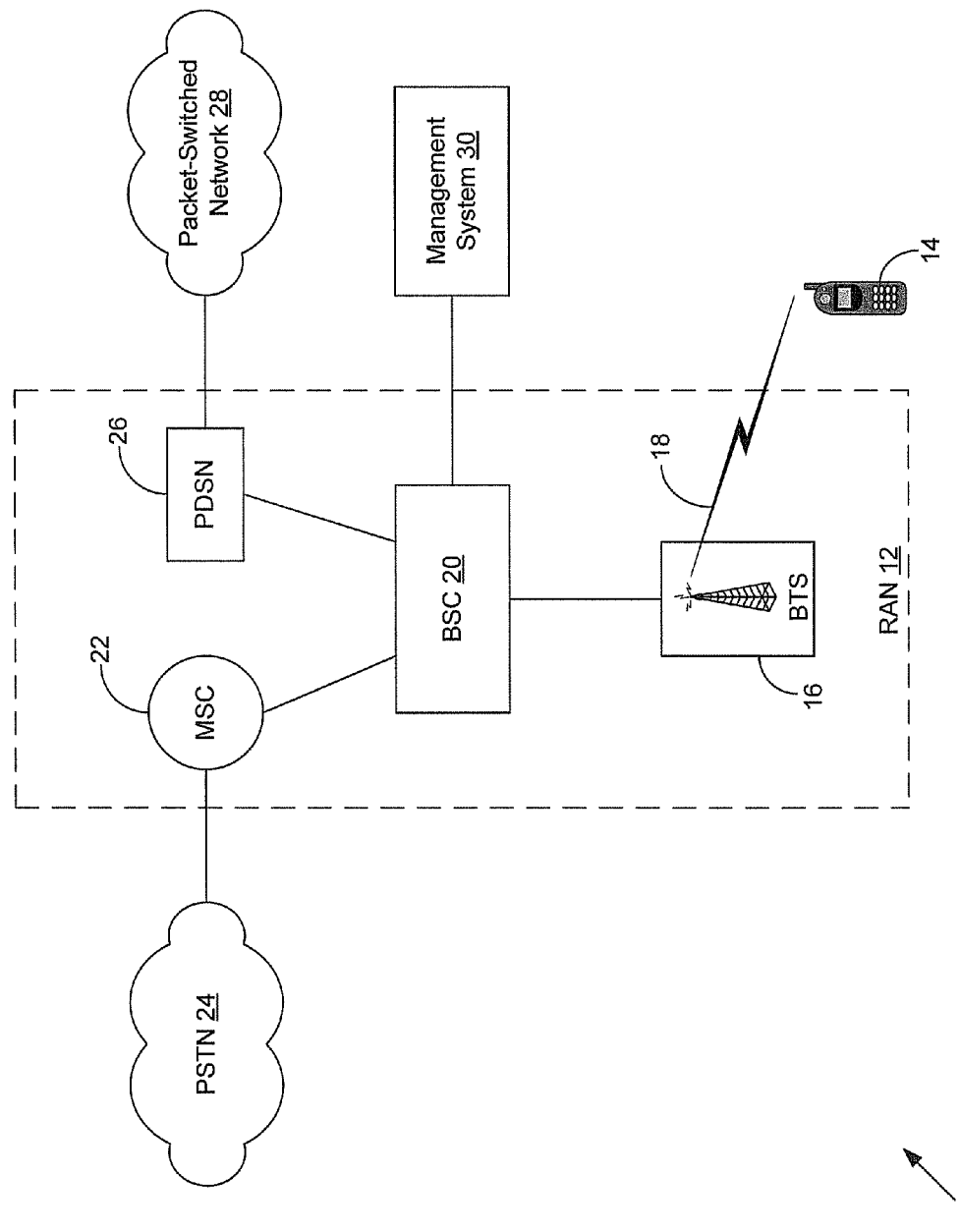
FIG. 1 is a block diagram of a wireless telecommunications network, in accordance with an exemplary embodiment.

The inventors propose methods and systems for using multiple reverse-link channel elements to receive a signal transmitted by a mobile station and/or multiple forward-link channel elements to transmit a signal to a mobile station. A radio access network (RAN) may use multiple channel elements to receive a signal or to transmit a signal in order to address a possible failure or performance degradation in one of the channel elements.

For example, the RAN may initially use a single channel element to receive a signal that is wirelessly transmitted by a mobile station over a reverse link channel (e.g., a reverse traffic channel that the RAN assigned to the mobile station for an active call). The RAN may detect a fault condition in the signal received through the channel element (e.g., by determining that a frame error rate in the received signal exceeds a threshold). In response, the RAN may ascertain whether a radio frequency (RF) condition, such as a low signal-to-noise level of the signal, accounts for the fault condition. If the RF condition accounts for the fault condition, then the RAN may continue using the single channel element to receive the signal.

On the other hand, if the RF condition does not account for the fault condition, then there may be a problem with the channel element itself. In that case, the RAN may allocate an additional channel element to receive the signal. The RAN may then receive the signal through both of the channel elements and may compare the quality of the signal received through the first, original channel element with the quality of the signal received through the second, additional channel element. If the second channel element results in a received signal with a higher signal quality (e.g., a lower frame error rate), the RAN may discontinue use of the first channel element to receive the signal. The RAN may remove the first channel element from service entirely (and may also disable other channel elements on the same card). Alternatively, the RAN may keep the first channel element in reserve, in which case the first channel element might only be used as a last resort. The RAN may also send an alarm to a management system so that other corrective action may be taken.

The RAN may use a similar approach for forward-link channel elements. For example, the RAN may use a first channel element to wirelessly transmit a signal to a mobile station over a forward link channel. In response to detecting a fault condition in the signal received by the mobile station over the forward link channel, the RAN may determine whether an RF condition accounts for the fault condition. If the RF condition does not account for the fault condition, the RAN may allocate a second channel element to wirelessly transmit the signal to the mobile station. The RAN may then use both the first and second channel elements to wirelessly transmit the mobile station and compare the quality of the received signals reported by the mobile station. If the mobile station reports that the signal transmitted through the second channel element results in a higher signal quality, the RAN may discontinue use of the first channel element to transmit the signal.

The first and second channel elements used to receive a signal or to transmit a signal could be located in the same base transceiver station (BTS) and could be associated with the same sector. For example, a controller may detect a fault condition in a signal that is received through or transmitted through a first channel element in a BTS, determine whether an RF condition accounts for the fault condition, and, in response to determining that the RF condition does not account for the fault condition, allocate a second channel element in the BTS such that the BTS uses both of the first and second channel elements to receive or to transmit the signal. Further, the controller may compare the quality of the received signals resulting from these two channel elements. If the second channel element results in a higher signal quality, the controller may discontinue use of the first channel element. The controller could be part of the BTS, or the controller could be in a separate network element, such as in a base station controller (BSC).

Alternatively, the first and second channel elements could be located in different BTSs. For example, after detecting a fault condition in a signal received through or transmitted through a first channel element in a first BTS, and after determining that an RF condition does not account for the fault condition, a controller may allocate a second channel element in a second BTS. The RAN may then use both the first channel element in the first BTS and the second channel element in the second BTS to receive or to transmit the signal. Further, the controller may compare the quality of the received signals resulting from these two channel elements. If the second channel element results in a higher signal quality, then the controller may discontinue use of the first channel element. The controller may also allocate an additional channel element for the other link to effect a handover from the first BTS to the second BTS. Thus, if the second channel element is a forward-link channel element, the controller may allocate a reverse-link channel element in the second BTS; if the second channel element is a reverse-link channel element, the controller may allocate a forward-link channel element in the second BTS.

In this way, the RAN may identify a possible failure or performance degradation in a channel element that is being used to receive or to transmit a signal and instead use a different channel element that may result in a better signal quality.

2. Exemplary Wireless Telecommunications Network

FIG. 1 is a block diagram of a wireless telecommunications network 10 in which exemplary embodiments may be employed. Wireless telecommunications network 10 includes a radio access network (RAN) 12 that can wirelessly communicate with mobile stations, such as mobile station 14. Mobile station 14 could be, for example, a wireless telephone, wireless personal digital assistant, wirelessly-equipped computer, or other wireless communication device.

To support wireless communication with mobile stations, such as mobile station 14, RAN 12 may include one or more base transceiver stations (BTSs), exemplified in FIG. 1 by BTS 16. BTS 16 has a wireless coverage area (e.g., a cell or one or more sectors) within which BTS 16 can wirelessly communicate with mobile stations. For example, BTS 16 may communicate with mobile station 14 over an air interface 18, as shown in FIG. 1. The wireless communications between BTS 16 and mobile station 14 over air interface 18 may be in accordance with a protocol such as 1xRTT CDMA, EVDO, GSM, WiMAX (IEEE 802.16), WiFi (IEEE 802.11), UMTS, LTE, or other wireless communication protocol.

Although FIG. 1 shows RAN 12 with only one BTS, it is to be understood that RAN 12 may include a greater number. RAN 12 may also include a controller, such as base station controller (BSC) 20, that controls one or more BTSs, such as BTS 16.

RAN 12 may, in turn, be communicatively coupled to one or more other types of networks. For example, RAN 12 may include a mobile switching center (MSC) 22 that is communicatively coupled to a circuit-switched network, such as PSTN 24, and to BSC 20. Alternatively or additionally, RAN 12 may include a packet data serving node (PDSN) 26 that is communicatively coupled to a packet-switched network 28, such as the Internet, and to BSC 20. It is to be understood, however, that the configuration of RAN 12 shown in FIG. 1 is exemplary only, as RAN 12 could be communicatively coupled to other types of networks and/or could be configured in other ways.

With the configuration of RAN 12 shown in FIG. 1, mobile station 14 may be able to engage in a voice call with one or more endpoints via PSTN 24. Such endpoints could be for example, landline stations or other mobile stations. Mobile station 14 may also be able to engage in a data call with one or more endpoints via packet-switched network 28. Such data calls may involve the exchange of voice (e.g., VoIP communications), data, video, and/or other media, with endpoints such as VoIP devices, e-mail servers, Web servers, gaming servers, instant messaging servers, or streaming media servers.

Wireless telecommunications network 10 may also include a management system 30 that monitors the operational status of RAN 12. As described below, management system 30 may receive an alarm from RAN 12 when RAN 12 detects a problem with a channel element. Personnel that monitor management system 30 may then respond to the alarm condition by taking corrective action.

3. Exemplary BTS

Figure 2:
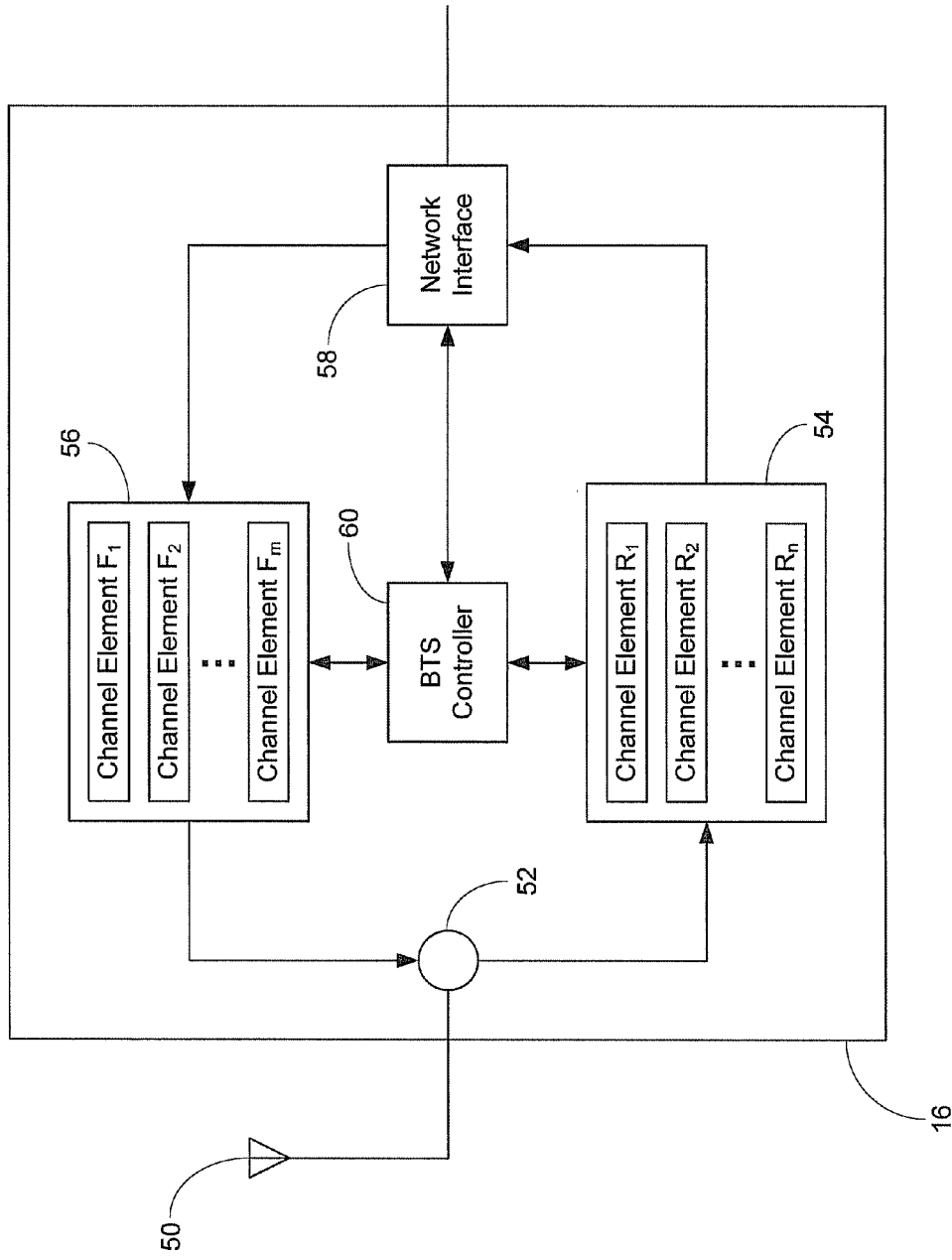
FIG. 2 is a block diagram of a base transceiver station (BTS), in accordance with an exemplary embodiment.

FIG. 2 illustrates an exemplary configuration for BTS 16. BTS 16 includes an antenna system 50 communicatively coupled to an RF distribution system 52. Antenna system 50 may include one or more antennas for wirelessly transmitting RF signals over one or more forward link channels and one or more antennas for wirelessly receiving RF signals over one or more reverse link channels. In an exemplary embodiment, antenna system 50 includes a plurality of directional antennas that define a plurality of sectors. For each sector, antenna system 50 may include, for example, at least one antenna for wirelessly transmitting RF signals and at least one antenna for wirelessly receiving signals.

RF distribution system 52 may distribute RF signals from antenna system 50 to a reverse link block 54 and RF signals from a forward link block 56 to antenna system 50. RF distribution system 52 may include, for example, coaxial cables, optical fibers, splitters, combiners, switches, and/or amplifiers, depending on the location and configuration of BTS 16.

BTS 16 may include a network interface 58 for interfacing BTS 16 with one or more network elements in RAN 12. For example, network interface 58 may interface BTS 16 with BSC 20. Network interface 58 may also be communicatively coupled to forward link block 56 and reverse link block 54. For example, network interface 58 may receive reverse-link signals from reverse link block 54 and transmit them to BSC 20. Further, network interface 58 may receive forward-link signals from BSC 20 and direct them to forward-link block 56 for transmission by antenna system 50.

Forward link block 56 may include a plurality of forward-link channel elements, shown in FIG. 2 as channel elements $F_1$ through $F_m$. Each forward-link channel element may be associated with a particular forward-link channel used by BTS 16. Thus, each of channel elements $F_1$ through $F_m$ may include hardware and/or software components that are configured to receive a network-level signal from network interface 58 and perform encoding, modulation, and/or other operations to convert the network-level signal into an RF signal that BTS 16 can transmit over a particular forward link channel. In the example illustrated in FIG. 2, forward link block 56 includes m forward-link channel elements. These m forward-link channel elements could all be associated with the same sector, or they could be used for multiple sectors. Further, different forward-link channel elements could be associated with different types of forward link channels. For example, in the case of a CDMA air interface, one of the m forward-link channel elements could be used to define a pilot channel, another could be used to define a sync channel, another could be use to define a paging or control channel, and the remainder could be used to define forward traffic channels.

Reverse link block 54 may include a plurality of reverse-link channel elements, shown in FIG. 2 as channel elements $R_1$ through $R_n$. Each reverse-link channel element may be associated with a particular reverse-link channel used by BTS 16. Thus, each of channel elements $R_1$ through $R_n$ may include hardware and/or software components that are configured to receive an RF signal corresponding to a particular reverse link channel and perform demodulation, decoding, and/or other operations to convert the RF signal into a network-level signal that network interface can transmit to BSC 20. In the example illustrated in FIG. 2, reverse link block 54 includes n reverse-link channel elements. These n reverse-link channel elements could all be associated with the same sector, or they could be used for multiple sectors. Further, different reverse-link channel elements could be associated with different types of reverse link channels. For example, some of the n reverse-link channel elements could be used for access channels and the remainder could be used for reverse traffic channels.

BTS 16 may also include a BTS controller 60 that controls the usage of forward-link channel elements $F_1$ through $F_m$ in forward link block 56 and reverse-link channel elements $R_1$ through $R_n$ in reverse link block 54. For example, BTS controller 60 may determine which channel element or elements should be allocated for a particular forward link or reverse link channel. As described in more detail below, BTS controller 60 may control the usage of forward-link channel elements $F_1$ through $F_m$ based, at least in part, on the quality of forward link signals received by mobile stations, and BTS controller 60 may control the usage of reverse-link channel elements $R_1$ through $R_n$ based, at least in part, on the quality of the network-level signals provided by the reverse-link channel elements.

BTS controller 60 may control forward link block 56 and/or reverse link block 54 either autonomously or in response to instructions from one or more other network elements, such as from BSC 20. For example, BTS controller 60 may obtain information regarding the quality of network-level signals provided by reverse-link channel elements in reverse link block 54 and/or information regarding signal qualities transmitted by forward-link channel elements in forward link block 56 and received by mobile stations, provide the information to BSC 20 via network interface 58, receive responsive instructions from BSC 20 via network interface 58, and control forward link block 56 and/or reverse link block 54 in accordance with the instructions.

4. Exemplary Methods

Figure 3:
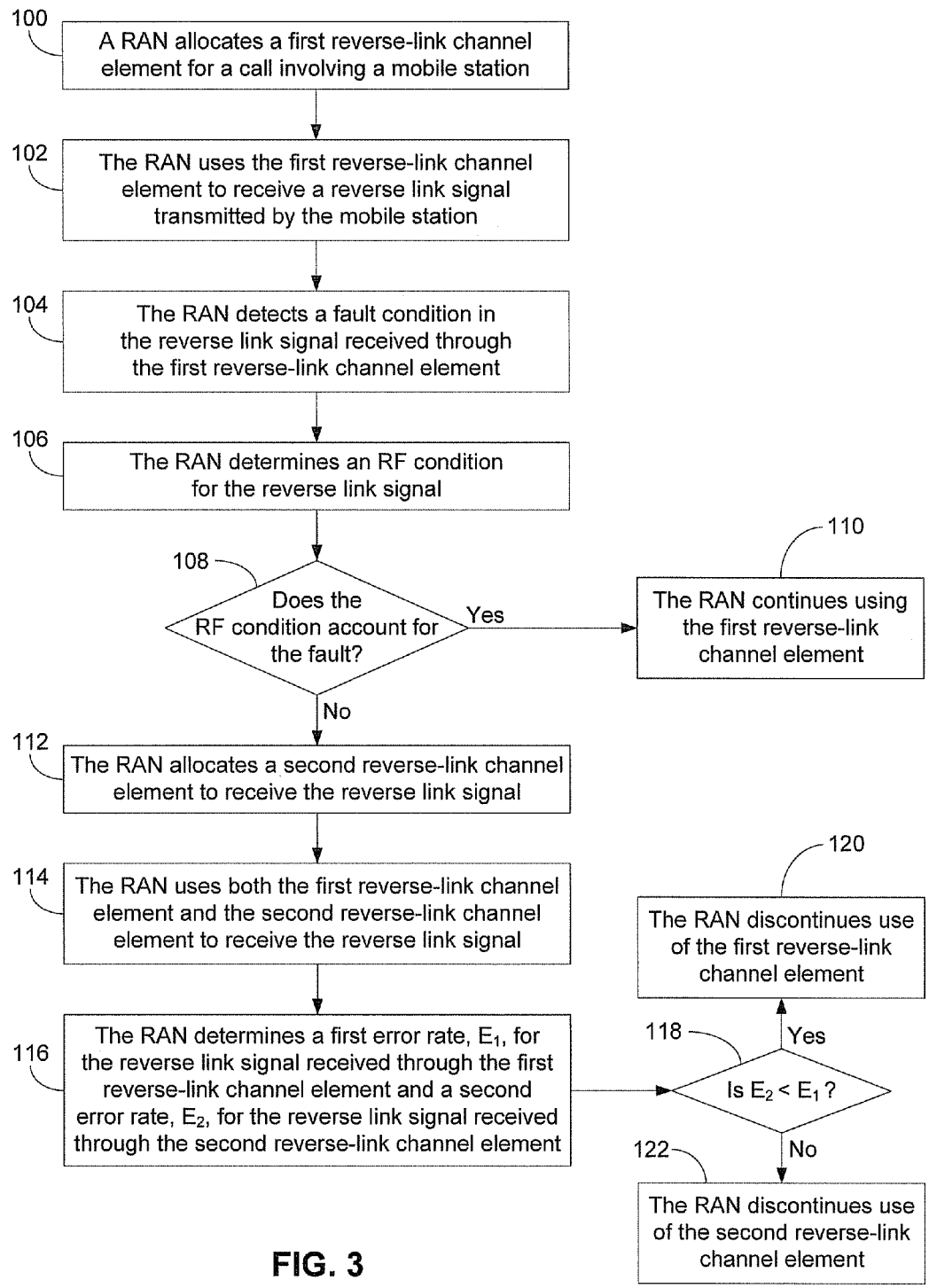
FIG. 3 is a flow chart illustrating a method of using reverse-link channel elements, in accordance with an exemplary embodiment.

FIG. 3 is a flow chart illustrating an exemplary method for using reverse-link channel elements. For purposes of illustration, FIG. 3 is described with reference to the configuration of wireless telecommunications network 10 shown in FIG. 1 and the configuration of BTS 16 shown in FIG. 2. It is to be understood, however, that other configurations could be used.

The method may begin when a RAN (e.g., RAN 12) allocates a first reverse-link channel element (e.g., channel element $R_1$ in BTS 16) for a call involving a mobile station (e.g., mobile station 14), as indicated by block 100. The call could be, for example, a voice call (e.g., a call carried over PSTN 24) or a data call (e.g., a call carried over packet-switched network 28). Moreover, the call could be a call that was originated by the mobile station or a call that was answered by the mobile station.

During the call, the RAN may use the first reverse-link channel element to receive a reverse link signal transmitted by the mobile station over a reverse link channel, as indicated by block 102. For example, the reverse link signal could be transmitted by the mobile station over a reverse traffic channel that the RAN assigned to the mobile station for the call.

At some point, the RAN may detect a fault condition in the reverse link signal received through the first reverse-link channel element, as indicated by block 104. The fault condition could be detected in various ways. In an exemplary embodiment, the reverse link signal comprises a sequence of frames. An element in the RAN (e.g., BTS controller 60 or BSC 20) may keep track of a frame error rate in the frames that are output by the first reverse-link channel element and compare the frame error rate to a predetermined threshold. If frame error rate exceeds the predetermined threshold, the RAN may detect a fault condition.

It is to be understood, however, that other criteria for detecting a fault condition could be used. For example, instead of frame error rate, a fault condition could be based on receiving a certain number of consecutive errored frames. Alternatively, other quality metrics could be used to determine when a fault condition occurs. In some cases, a fault condition could be indicated by power control commands that the BTS sends to the mobile station to control the transmit power level of the reverse link signal. For example, a fault condition may be indicated if the BTS continuously sends power-up commands to the mobile station after deploying the first reverse-link channel element. That situation may indicate that the first reverse-link channel element is not functioning properly despite the mobile station's transmit power level.

The RAN may also determine an RF condition for the reverse link signal, as indicated by block 106. The RF condition could be any parameter or combination of parameters that may be used to distinguish between a fault condition caused by poor RF communications (e.g., poor communications over air interface 18) and a fault condition caused by a problem in the channel element itself. The RF condition could be a signal-to-noise ratio of the reverse link signal. As one example, the RF condition could be based on an $E_c/I_0$ measurement of the reverse link signal received by the RAN, where $E_c$ is the chip energy and $I_0$ is the total RF energy in the frequency band. As another example, the RF condition could be based on an $E_b/N_0$ measurement of the reverse link signal after it has been de-spread by the first reverse-link channel element, where $E_b$ is the bit energy and $N_0$ is the noise.

The RF condition could be determined by the RAN based on one or more measurements taken after the fault condition was detected and/or one or more measurements that were taken before the fault condition was detected. The one or more measurements of the reverse link signal could be performed by the RAN itself. Alternatively, the RAN could determine the RF condition based on one or more measurements reported by other entities, such as reports from other mobile stations.

The RAN may determine whether the RF condition accounts for the fault condition, as indicated by block 108. The RAN may make this determination in various ways. For example, if the RF condition is a signal-to-noise ratio, the RAN may compare the signal-to-noise ratio to a threshold value. If the signal-to-noise ratio is less than the threshold value, then the RAN may determine that the RF condition (i.e., the low signal-to-noise ratio) accounts for the fault condition. However, if the signal-to-noise ratio exceeds the threshold value, then the RAN may determine that the RF condition does not account for the fault condition.

Other criteria could also be used to distinguish between a fault condition that is likely to be caused by a problem with a reverse-link channel element and a fault condition that is likely to be caused by poor RF conditions. Such criteria may use a combination of metrics, such as frame error rate, $E_c/I_0$ measurements, $E_b/N_0$ measurements, and power control commands sent to the mobile station. The RAN could also compare how reverse link signals from a mobile are received by different reverse-link channel elements. For example, a mobile station may be involved in a soft handoff such that its reverse link signal is received by multiple reverse-link channel elements (e.g., different reverse link channel elements in different sectors). If there is a fault condition in only one of the reverse-link channel elements, then the RAN may consider that fault condition to be the result of a faulty reverse-link channel element rather than poor RF conditions.

If the RAN determines that the RF condition accounts for the fault condition, then the RAN may continue using the first reverse-link channel element, as indicated by block 110. If the RAN determines that the RF condition does not account for the fault condition, then the RAN may allocate a second reverse-link channel element (e.g., channel element $R_2$ in BTS 16) to receive the reverse link signal, as indicated by block 112.

The RAN may then use both the first reverse-link channel element and the second reverse-link channel element to receive the reverse link signal, as indicated by block 114. With both the first and second reverse-link channels being used to receive the reverse link signal, the RAN may compare the signal qualities resulting from the two different channel elements. For example, the RAN may determine a first error rate, $E_1$, for the reverse link signal received through the first reverse-link channel element and a second error rate, $E_2$, for the reverse link signal received through the second reverse-link channel element, as indicated by block 116. The error rates could be, for example, frame error rates, block error rates, or bit error rates.

To determine whether the second reverse-link channel element results in an improved signal quality, the RAN may compare the error rates, $E_1$ and $E_2$, as indicated by block 118. If $E_2$ is less than $E_1$, indicating that the second reverse-link channel element results in a lower error rate and, thus, a better signal quality, then the RAN may discontinue using the first reverse-link channel element for the reverse link signal, as indicated by block 120. The RAN might subsequently use the first reverse-link channel element for a reverse link signal from a different mobile station. Alternatively, the RAN may consider the first reverse-link channel element to be defective and remove it from service entirely. The RAN may also generate an alarm (e.g., an alarm transmitted to monitoring system 30) so that further corrective action regarding the first reverse-link channel element may be taken.

If $E_2$ and $E_1$ are approximately equal (or if $E_2$ is greater than $E_1$), indicating that the second reverse-link channel element does not result in an improved signal quality, then the RAN may discontinue using the second reverse-link channel element to receive the reverse link signal, as indicated by block 122. As a result, the second reverse-link channel element would be available to receive a reverse link signal from a different mobile station.

It is to be understood, however, that the method shown in FIG. 3 and described above is exemplary only. For example, instead of using frame error rates or other error rates to compare the signal qualities resulting from the first and second reverse-link channel elements, the RAN could use other types of quality metrics to measure and compare the qualities of the reverse link signal received through the first and second reverse-link channel elements.

In addition, the comparison of signal qualities could be deemed sufficient to determine whether the first reverse-link channel element is defective, without making a determination of an RF condition and without determining whether an RF condition accounts for a fault condition that is detected in the reverse link signal. Thus, once a fault condition is detected in a reverse link signal, the RAN may start using a second reverse-link channel element to receive the reverse link signal, without first determining whether the RF condition accounts for the fault condition. Then, if the second reverse-link channel elements results in a better signal quality, the RAN may discontinue using the first reverse-link channel element.

Figure 4:
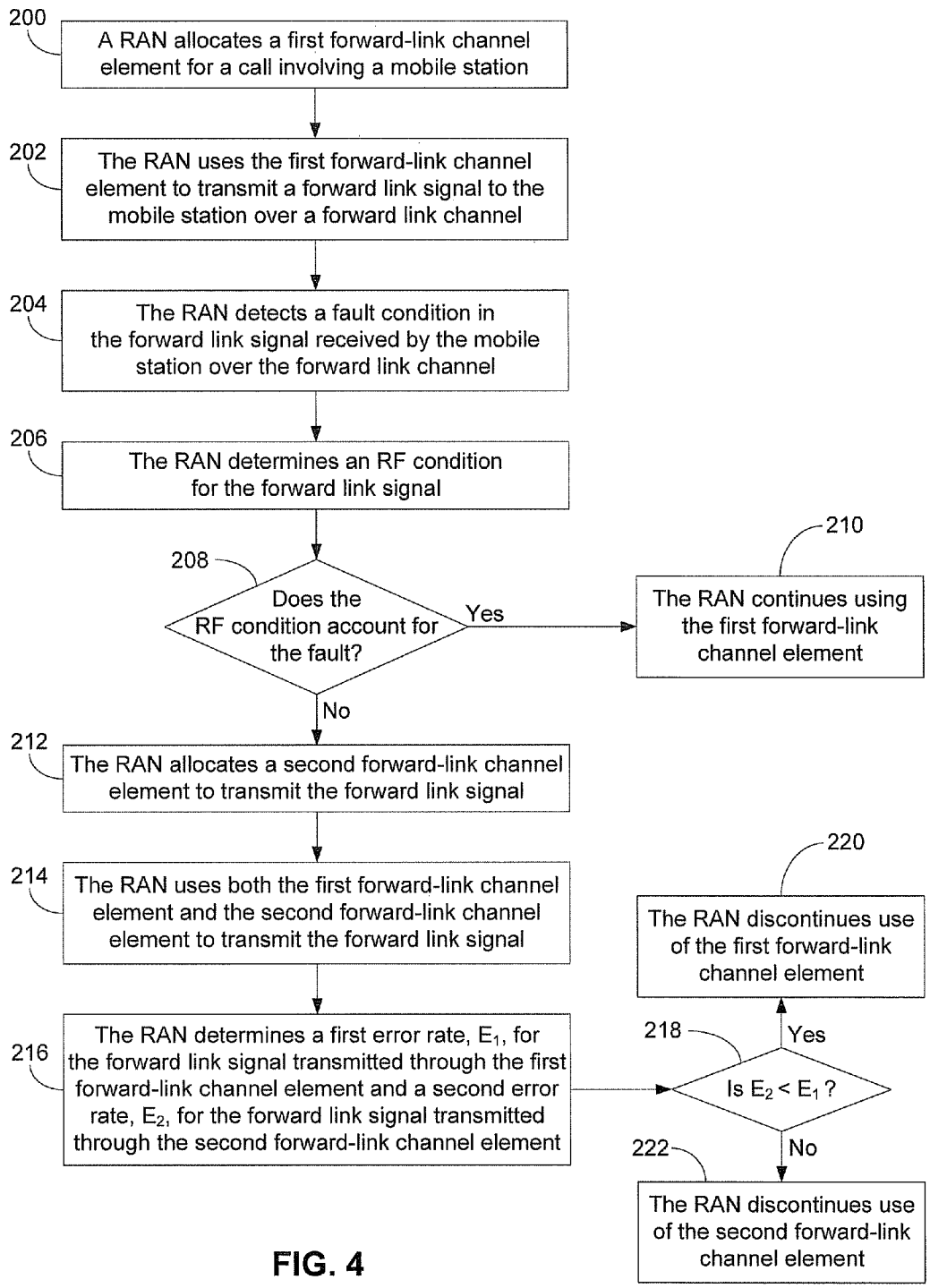
FIG. 4 is a flow chart illustrating a method of using forward-link channel elements, in accordance with an exemplary embodiment

Whereas FIG. 3 illustrates a method for using reverse-link channel elements, a similar approach may be used for the forward link. In this regard, FIG. 4 illustrates an exemplary method of using forward-link channel elements. The method may begin when a RAN allocates a first forward-link channel element (e.g., channel element $F_1$ in BTS 16) for a call involving a mobile station, as indicated by block 200. The RAN may then use the first forward-link channel element to transmit a forward link signal to the mobile station over a forward link channel (e.g., a forward traffic channel), as indicated by block 202.

At some point, the RAN may detect a fault condition in the forward link signal received by the mobile station over the forward link channel, as indicated by block 204. The RAN may detect a fault condition in the forward link signal received by the mobile station in various ways. In some embodiments, the RAN may receive from the mobile station a report of a frame error rate that the mobile station obtained for the forward link signal. The RAN may compare the reported frame error rate to a threshold, and a fault condition may be indicated if the reported frame error rate exceeds the threshold. The mobile station may send such reports to the RAN periodically, in response to the mobile station detecting an unusually high frame error rate, or in response to a request from the RAN.

Alternatively, the RAN may detect a fault condition in the forward link signal in other ways. For example, a fault condition could be based on power control commands that the mobile station sends to the RAN to control the transmit power level. In particular, a fault condition may be indicated if, after deploying the first forward-link channel element for the mobile station, the RAN continually receives power-up commands from the mobile station. This situation may indicate that the mobile station is not receiving a good forward link signal no matter what transmit power is used, which, in turn, may indicate a problem with the channel element used to transmit the forward link signal.

The RAN may also determine an RF condition for the forward link signal, as indicated by block 206. In an exemplary embodiment, the RAN determines the RF condition of the forward link signal based on a signal strength of a pilot signal that the mobile station measures and reports to the RAN. For example, the mobile station may periodically obtain an $E_c/I_0$ measurement of the pilot signal and report this measurement to the RAN.

How the RAN responds to the fault condition may depend on whether the RF condition accounts for the fault condition, as indicated by block 208. In the case that the RF condition is based on the mobile station's $E_c/I_0$ measurement of the pilot signal, the RAN may determine whether the RF condition accounts for the fault condition by comparing the $E_c/I_0$ measurement to a threshold. If $E_c/I_0$ exceeds the threshold, then the RAN may determine that the RF condition does not account for the fault condition. If $E_c/I_0$ is below the threshold, then the RAN may determine that the fault condition results from a poor RF condition.

If the RF condition accounts for the fault condition, then the RAN may continue using the first forward-link channel to transmit the forward link signal, as indicated by block 210. If the RF condition does not account for the fault condition, the RAN may allocate a second forward-link channel element to transmit the forward link signal, as indicated by block 212. The RAN may then use both the first forward-link channel element and the second forward-link channel element to transmit the forward link signal, as indicated by block 214.

The first and second forward-link channel elements may transmit the forward link signal over the same forward link channel (e.g., using the same Walsh code). Alternatively, the first forward-link channel element may transmit the forward link signal over a first forward link channel and the second forward-link channel element may transmit the forward link signal over a second, different forward link channel. For example, the RAN may instruct the mobile station to drop the sector associated with the first forward-link channel element and then instruct the mobile station to re-establish communication with the sector using the second forward link channel. In this way, the RAN may be able to use a second forward-link channel element for transmitting the forward link signal over a second forward link channel in place of the first forward-link channel element that was transmitting the forward link signal over a first forward link channel. This approach may be appropriate when the mobile station is engaged in a soft handoff.

The RAN may determine the signal qualities of the forward link signal received by the mobile station when transmitted through the first forward-link channel element and when transmitted through the second forward-link channel element. For example, the RAN may determine a first error rate, $E_1$, for the forward link signal transmitted through the first forward-link channel element and received by the mobile station and a second error rate, $E_2$, for the forward link signal transmitted through the second forward-link channel element and received by the mobile station, as indicated by block 216. The RAN may determine the error rates, $E_1$ and $E_2$, for example, based on information reported by the mobile station.

The RAN may compare the error rates, $E_1$ and $E_2$, to determine whether the second forward-link channel element results in a lower error rate, as indicated by block 218. If $E_2$ is less than $E_1$, then the second forward-link channel element results in a lower error rate, and the RAN may discontinue use of the first forward-link channel element to transmit the forward link signal, as indicated by block 220. The RAN may take the first forward-link channel element out of service and may generate an alarm (e.g., an alarm transmitted to management system 30) so that further corrective action may be taken with respect to the first forward-link channel element.

On the other hand, if the second forward-link channel element does not result in an improved signal quality (for example, if $E_2$ is greater than or equal to $E_1$), then the RAN may discontinue use of the second forward-link channel element for transmitting the forward link signal, as indicated by block 222.

It is to be understood that the method shown in FIG. 4 and described above is exemplary only. For example, instead of the RAN making the comparison between the error rates, $E_1$ and $E_2$, the mobile station could make the comparison and report the result to the RAN. The RAN may then discontinue use of either the first forward-link channel element or the second forward-link channel element, in response to the mobile station's report. In addition, when the RAN detects a fault condition in the forward link signal received by the mobile station, the RAN may begin using a second forward-link channel to transmit the forward link signal without first determining whether an RF condition accounts for the fault condition.

The methods shown in FIGS. 3 and 4 and described above could be performed, at least in part, by a controller in the RAN, such as BTS controller 60, BSC 20, or BTS controller 60 operating in combination with BSC 20. Thus, the controller may be configured to perform one or more of the following functions: (i) detecting a fault condition in a forward link or reverse link signal that is transmitted through or received through a first channel element, (ii) determining whether an RF condition accounts for that fault condition, (iii) in response to a determination that the RF condition does not account for the fault condition, allocating a second channel element, such that both the first and second channel elements are used to transmit or receive the signal, (iv) compare the error rates or other quality metrics of the received signals resulting from the use of the first and second channel elements, and (v) discontinue use of the first channel element if the second channel elements results in a lower error rate, or otherwise results in a higher signal quality.

In this way, the RAN may identify a channel element that may be failing or otherwise performing inadequately and instead use a channel element that results in a better signal quality.

5. CONCLUSION

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for a radio access network (RAN), comprising:
   said RAN using a first channel element to receive a signal that is wirelessly transmitted by a mobile station over a reverse link channel;
   said RAN detecting a fault condition in said signal received through said first channel element;
   said RAN determining that a radio frequency (RF) condition does not account for said fault condition, wherein said RAN determining that the RF condition does not account for said fault condition comprises said RAN determining a signal-to-noise ratio of said signal and determining that said signal-to-noise ratio exceeds a threshold value;
   in response to determining that said RF condition does not account for said fault condition, said RAN allocating a second channel element to receive said signal; and
   said RAN using both of said first and second channel elements to receive said signal.

2. The method of claim 1, wherein said reverse link channel is a reverse traffic channel.

3. The method of claim 2, wherein said signal is transmitted by said mobile station for an active call.

4. The method of claim 1, wherein said signal comprises a sequence of frames.

5. The method of claim 4, wherein said RAN detecting a fault condition in said signal received through said first channel element comprises:
   said RAN calculating a frame error rate for said sequence of frames; and
   said RAN determining that said frame error rate exceeds a predetermined threshold.

6. The method of claim 1, wherein said RAN using both of said first and second channel elements to receive said signal comprises:
   said RAN receiving said signal through said first channel element to obtain a first-element received signal; and
   said RAN receiving said signal through said second channel element to obtain a second-element received signal.

7. The method of claim 6, further comprising:
   said RAN determining a first quality metric for said first-element received signal and a second quality metric for said second-element received signal; and
   said RAN making a comparison of said first and second quality metrics.

8. The method of claim 7, further comprising:
   said RAN making a determination, based on said comparison, that said second-element received signal has a higher quality than said first-element received signal; and
   in response to said determination, said RAN discontinuing use of said first channel element to receive said signal.

9. The method of claim 8, wherein said RAN determining a first quality metric for said first-element received signal and a second quality metric for said second-element received signal comprises:
   said RAN determining a first error rate for said first-element received signal and a second error rate for said second-element received signal.

10. The method of claim 9, wherein said RAN making a determination, based on said comparison, that said second-element received signal has a higher quality than said first-element received signal comprises:
    said RAN determining that said second error rate is lower than said first error rate.

11. A method for a radio access network (RAN), comprising:
    said RAN using a first channel element to wirelessly transmit a signal to a mobile station over a forward link channel;
    said RAN detecting a fault condition in said signal received by said mobile station;
    said RAN determining that a radio frequency (RF) condition does not account for said fault condition, wherein said RAN determining that the RF condition does not account for said fault condition comprises said RAN determining a signal-to-noise ratio of said signal and determining that said signal-to-noise ratio exceeds a threshold value;
    in response to determining that said RF condition does not account for said fault condition, said RAN allocating a second channel element to wirelessly transmit said signal; and
    said RAN using both of said first and second channel elements to wirelessly transmit said signal to said mobile station.

12. The method of claim 11, wherein said RAN detecting a fault condition in said signal received by said mobile station comprises:
    said RAN receiving from said mobile station a report identifying a frame error rate of said signal received by said mobile station; and
    said RAN determining that said frame error rate exceeds a predetermined threshold.

13. The method of claim 11, further comprising:
    said RAN receiving from said mobile station at least one report identifying a first error rate of a first received signal corresponding to said signal transmitted through said first channel element and a second error rate of a second received signal corresponding to said signal transmitted through said second channel element; and
    said RAN comparing said first and second error rates.

14. The method of claim 13, further comprising:
    said RAN making a determination that said second error rate is lower than said first error rate; and
    in response to said determination, said RAN discontinuing use of said first channel element to transmit said signal to said mobile station.

15. A system, comprising:
    a plurality of reverse-link channel elements for receiving signals over reverse link channels; and a controller, wherein said controller is configured to detect a reverse-link fault condition in a reverse link signal that is wirelessly transmitted by a transmitting device and received through a first reverse-link channel element in said plurality of reverse-link channel elements, determine whether a radio frequency condition of said reverse link signal accounts for said reverse-link fault condition, and in response to determining that that said radio frequency condition of said reverse link signal does not account for said reverse-link fault condition, (i) allocate a second reverse-link channel element in said plurality of reverse-link channel elements such that both of said first and second reverse-link channel elements are used to receive said reverse link signal, (ii) compare a first reverse-link error rate of said reverse link signal received through said first reverse-link channel element to a second reverse-link error rate of said reverse link signal received through said second reverse-link channel element, and (iii) discontinue use of said first reverse-link channel element to receive said reverse link signal if said second reverse-link error rate is lower than said first reverse-link error rate.

16. The system of claim 15, further comprising:
a plurality of forward-link channel elements for transmitting signals over forward link channels; and
wherein said controller is further configured to detect a forward-link fault condition in a forward link signal that is wirelessly transmitted through a first forward-link channel element in said plurality of forward-link channel elements and received by a receiving device, determine whether a radio frequency condition of said forward link signal accounts for said forward-link fault condition, and in response to determining that that said radio frequency condition of said forward link signal does not account for said forward-link fault condition, allocate a second forward-link channel element in said plurality of forward-link channel elements such that both of said first and second forward-link channel elements are used to wirelessly transmit said forward link signal to said receiving device.

17. The system of claim 16, wherein said controller is further configured to compare a first forward-link error rate of said forward link signal transmitted through said first forward-link channel element and received by said receiver to a second forward-link error rate of said forward link signal transmitted through said second forward-link channel element and received by said receiving device, and discontinue use of said first forward-link channel element to transmit said forward link signal if said second forward-link error rate is lower than said first forward-link error rate.

18. The system of claim 16, wherein said receiving device is a mobile station.

19. The system of claim 15, wherein said transmitting device is a mobile station.

\* \* \* \* \*